United States Patent [19]

Ford et al.

[11] Patent Number: 5,208,297
[45] Date of Patent: May 4, 1993

[54] RARE EARTH METAL COORDINATION COMPOUNDS AS LACTONE POLYMERIZATION CATALYSTS

[75] Inventors: Thomas M. Ford, Greenville; Stephan J. McLain, Wilmington, both of Del.

[73] Assignee: E. I. Du Pont de Nemours and Company, Wilmington, Del.

[21] Appl. No.: 814,135

[22] Filed: Dec. 30, 1991

[51] Int. Cl.$^5$ .................. C08G 63/84; C08G 63/91
[52] U.S. Cl. .................. 525/415; 528/354; 528/357
[58] Field of Search .............. 525/415; 528/354, 357

[56] References Cited

U.S. PATENT DOCUMENTS

| | | | |
|---|---|---|---|
| 4,289,873 | 9/1981 | Kubo et al. | 528/357 |
| 4,357,462 | 11/1982 | Kubo et al. | 528/357 |
| 4,853,459 | 8/1989 | Stewart | 528/371 |
| 5,028,667 | 7/1991 | McLain et al. | 525/415 |

FOREIGN PATENT DOCUMENTS

91/16368  10/1991  World Int. Prop. O. .

OTHER PUBLICATIONS

A. J. Nijenhuis et al., *Polymer Bull.* (1991) 26, pp. 71–77.
Shen, Z.; Sun, J. and Wu, J., *Huaxue Xuebao* 48(7), pp. 686–689 (1990).
Maciej Bero et al., *Makromol. Chem.* 191, 2287–2296 (1990).

*Primary Examiner*—John Kight, III
*Assistant Examiner*—Shelley Wright

[57] ABSTRACT

A process for polymerizing lactide and up to 20 mole percent of another lactone is disclosed. The cayalysts used have the formula MZ$_3$ wherein M is scandium, yttrium, bismuth, a lanthanide series rare earth metal or a mixture thereof and the Zs are independantly the same or different highly coordinating ligands. The preferred metals M are lanthanum, cerium, praseodymium and neodymium with lanthanum being especially preferred. The preferred ligands are betadiketones, betaketoesters and malonate anions with the beta diketones such as 2,2,6,6-tetramethyl-3,5-heptanedionates being especially preferred.

14 Claims, No Drawings

RARE EARTH METAL COORDINATION COMPOUNDS AS LACTONE POLYMERIZATION CATALYSTS

BACKGROUND OF THE INVENTION

1. Field of the Invention

The present invention relates to the polymerization of lactide (either S or R) using a bismuth, scandium, yttrium or lanthanide series rare earth metal based catalyst.

2. Description of the Related Art

Lactides are presently polymerized to high molecular weight plastics using tin, titanium, zinc and other metal based catalysts by ring opening polymerization of the cyclic ester:

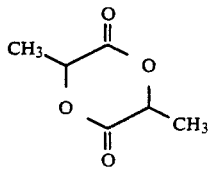

The resulting polymers of lactide are useful in medical applications such as wound closure devices, orthopedic implants, controlled release drug carriers, as well as degradable paper coatings and plastic packaging films.

A. J. Nijenhuis et. al., disclosed lactide could be polymerized using Sn(acetylacetonate)$_2$ and substituted Zn(II) acetylacetonate complexes as catalyst. They claimed the very high crystallinity polymer was produced because the polymerization rate was lower than the crystallization rate, thus allowing polymeriation directly onto the p-lactide crystal (*Polymer Bull.* (1991), 25, pp. 71-77).

U.S. Pat. No. 4,853,459 discloses ring-opening polymerization of cyclic carbonates at 200°-350° C. using coordination compounds of lanthanides such as Cerium tris(acetylacetonate).

Shen, Z.; Sun, J. and Wu, L., *Huaxue Xuebao*, 48(7), pp. 686-689(1990), disclose solution polymerization of DL-lactide using a mixture of aluminum alkyls, rare earth compounds, and water.

U.S. Pat. No. 5,028,667 discloses the polymerization of various lactones including lactide using yttrium and lanthanide series rare earth based catalysts. In a commonly assigned U.S. application serial number CH-1883, concurrently filed herewith, preferred catalysts within U.S. Pat. No. 5,028,667 for use in melt polymerizations of lactide are disclosed.

SUMMARY OF THE INVENTION

The present process relates to a process for the polymerization of lactide and optionally up to 20 mole % based on lactide of one or more lactones selected from

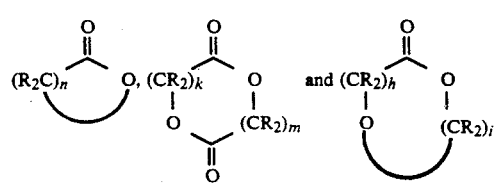

by contacting a melt of lactide and the optional lactone with one or more catalysts having the formula MZ$_3$, wherein n is 4 or 5, h, i, k, and m are independently 1 or 2, each R is independently selected from hydrogen or hydrocarbyl containing up to 20 carbon atoms or substituted hydrocarbyl containing up to 20 carbon atoms, M is chosen from scandium, yttrium, bismuth, or a lanthanide series rare earth metal, and Z can be the same or different and are selected from certain highly coordinating ligands such as beta-diketonates such as 2,2,6,6-tetramethylheptan-3,5-dionate and acetylacetonate, fluoride, chloride, bromide, iodide, carboxylate, tetrasubstituted porphyrinato (−2), phthalcyanato (−2), beta-ketoester anions such as methylacetoacetate, dialkylmalonate anion, cyclopentadienide, pentamethylcyclopentadienide, and aryloxide such as phenoxide, where at least one of the Z groups is selected from beta-diketonates, beta-ketoesters and malonate anions.

DESCRIPTION OF THE PREFERRED EMBODIMENTS

The present invention relates to a process for the ring opening polymerization of molten lactide and up to 20 mole % based on lactide of another lactone using as catalysts certain compounds of scandium, yttrium, bismuth or lanthanide series rare earth metal.

The lactones which can used as comonomers in the process of the present invention include:

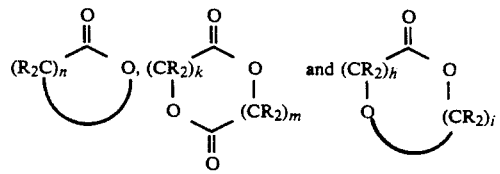

wherein n is 4 or 5, h, i, k, and m are independently 1 or 2 and each R is independently chosen from H or hydrocarbyl containing up to 12 carbon atoms. Preferred lactones are those in which R is hydrogen or methyl, and especially preferred lactones are e-caprolactone, d-valerolactone, glycolide (1,4-dioxan-2,5-dione), 1,5-dioxepan-2-one and 1,4-dioxan-2-one.

The catalysts for this polymerization are compounds of scandium, yttrium, bismuth and the rare earth metals. Rare earth metals include those elements with atomic numbers 57 thru 71, namely lanthanum, cerium, praseodymium, neodymium, promethium, samarium, europium, gadolinium, terbium, dysprosium, holmium, erbium, thulium, ytterbium, and lutetium. Preferred metals are lanthanum, cerium, praseodymium, and neodymium. In all of the catalysts the metal is trivalent. The catalyst preferably is at least slightly soluble in the molten lactide or lactone mixture.

Whereas lactide can be polymerized according to U.S. Pat. No. 5,028,667, some of the catalysts disclosed therein were found subsequently not to be stable at the temperatures used for melt polymerization of lactide. See U.S. Ser. No. (Ch-18830) concurrently filed herewith and incorporated by reference. Those catalysts of U.S. Pat. No. 5,028,667, bearing up to two highly coordinating ligands such as 1,3-diketonate ligands such as 2,2,6,6-tetramethylheptan-3,5-dionate and acetylacetonate, fluoride, chloride, bromide, iodide, carboxylate, tetrasubstituted porphyrinato (−2), phthalcyanato (−2), beta-ketoester anions such as methylacetoacetate, dialkylmalonate anion, cyclopentadienide, pentamethylcyclopentadienide, and aryloxide such as phenoxide stabilized the complex, allowing high yields of polylactides via melt polymerization.

Quite surprisingly, it has now been found that transferrable alkoxide groups are not necessary for catalytic activity in lactide polymerizations. Thus, complexes of scandium, yttrium, bismuth and the rare earth metals where all the ligands are highly coordinating ligands (such as those cited immediately above) are not only quite active as catalysts for high yield and rapid lactide polymerizations, but they have the following added important features:
1. They are easily synthesized from inexpensive metal salts
2. They are air and moisture stable
3. They give lower color in the produced polymers It is to be further appreciated that many of the compounds that are catalysts often do not exist in simple monomeric form, but are more highly coordinated and exist as "cluster compounds" or as "nonstoichiometric compounds". A review of yttrium and rare earth chemistry applicable to catalysts of the present invention is R. C. Mehotra, P. N. Kapoor, and J. M. Batwara, *Coordination Chemical Reviews*, Vol. 31, (1980), pp 67-91. It is understood that even if such compounds do not exist as simple $MZ_3$ species, such compounds where the metal is trivalent are included within the meaning of active catalysts, and are included in the meaning of structure $MZ_3$ in this specification. An example of such a cluster compound is $Nd_4(OH)_2(acetylacetonate)_{10}$ in F. Hart, *Comprehensive Coordination Chemistry*, Vol. 3, pp. 1077-1081.

It will also be understood by those skilled in the art that if more than one type of Z group is present in a catalyst or mixture of two catalysts containing different Z groups is used, "redistribution" reactions may take place. By redistribution reactions is meant exchange of Z groups between metal atoms, so that it is possible, in theory, to obtain any combination of Z groups present on any particular metal atom.

By hydrocarbyl is meant any monovalent radical that contains only carbon and hydrogen. By substituted hydrocarbyl is meant any monovalent hydrocarbyl radical that contains other functional groups that do not substantially interfere with the reaction or react with any of the reactants or products. Suitable functional groups include halo, ester, ether, amino, thioether, silyl, hydroxy, carbon-carbon unsaturation (i.e., double or triple bonds) and aldehyde. Trivalent scandium, yttrium, bismuth and rare earth compounds will not be stable if they contain a functional group whose pKa is less than that of the pKa of the conjugate acid of the functional group bonded to the metal. A special case may arise where the two pKas are approximately equal. Then, an equilibrium may exist as to which group is bound to the metal, and if such groups fit the definition of Z above, then both will initiate polymerization.

The polymerization of the present invention is carried out in the absence of any solvent in the molten lactide or lactide mixture at from 100° to 220° C., preferably from 110° to 200° C. and most preferably from 165° to 180° C.

It is preferred to use a dry inert gas such as nitrogen or argon to blanket the reaction. Moisture is deleterious to the activity of the catalyst due to hydration, and can limit the molecular weight of the polymer produced. The starting materials should be dry. Drying methods are known to those skilled in the art, and include distillation from calcium hydride, passage over activated molecular sieves, or crystallization.

Preferred catalysts are those wherein at least one ligand Z is a betaketonate, betaketonate ester or malonate ion. Even more preferred are those catalysts wherein all three ligands z are a betaketonate, betaketonate ester or mallenate ion. The particularly preferred catalysts are materials where all three of the ligands are 1,3-diketonate, and where the metal is lanthanum. An example of this class is lanthanum tris(2,2,6,6-tetramethylheptan-3,5-dionate):

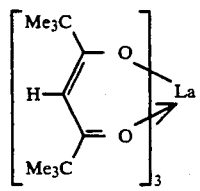

The advantages of the process of the present invention are that it is fast, provides a product with better thermal stability as determined by weight loss at 200° C. and involves fewer side reactions as observed by color formation than many of the highly active catalysts in the literature. It has advantages over previous yttrium and rare earth based processes in that the catalysts are less expensive to produce, are stable to moisture and give even lower levels of color in polylactides and lactide copolymers.

Several of the catalysts utilized in the process of the present invention are new materials. General experimental procedures for the preparation of these compounds is described as follows:

All preparations were done under an atmosphere of dry nitrogen or argon, either in a drybox or in Schlenk type glassware. Tetrahydrofuran (THF) was dried by distillation from sodium benzophenone ketyl. Toluene was dried by distillation from metallic sodium argon. Acetone was sparged with argon and dried over activated 4A molecular sieves. Commercial lanthanum isopropoxide (Strem Chemicals) was purified by dissolving in dry toluene, filtering the solution to remove insolubles, and then removing the toluene in vacuo to give a white solid which was dried under high vacuum at room temperature. Acetylacetone was distilled under nitrogen. Solvents and liquid reagents were stored over activated 4A molecular sieves in a drybox. $^1H$ NMR spectra were recorded at 300 MHz and are reported in ppm downfield of $Me_4Si$.

Lanthanum isopropoxide was used as a starting material in several of the preparations. The lanthanide isopropoxides were originally reported to have the stoichiometry $La(OCHMe_2)_3$ by K. S. Mazdiyasni, C. T. Lynch, and J. S. Smith, *Inorg. Chem.*, Vol. 5, (1966), pp. 342-346, and L. M. Brown and K. S. Mazdiyasni, *Inorg. Chem.*, Vol. 9, (1970), pp 2783-2786. Reactions of the lanthanide isopropoxides with ligands such as acetylacetone and beta-ketoesters were portrayed as reactions of tris alkoxides to give tris ligand complexes by B. S. Sankhla and R. N. Kapoor, *Aust. J. Chem.*, Vol. 20, (1967), pp. 685-688 and S. N. Misra, T. N. Misra, and R. C. Mehrotra, *Indian J. Chem.*, Vol. 5, (1967), pp. 372-374, as follows:

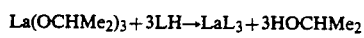

La(OCHMe$_2$)$_3$+3LH→LaL$_3$+3HOCHMe$_2$

A recent X-ray crystal structure by O. Poncelet et. al., *Inorg. Chem.*, Vol. 28, (1989), pp. 263-267 shows that the true stoichiometry of yttrium isopropoxide is $Y_5(O)(OCHMe_2)_{13}$. Based upon elemental analysis, O. Poncelet and L. G. Hubert-Pfalzgraf, *Polyhedron*, Vol. 8, (1989), pp. 2183-2188, concluded that neodymium isopropoxide is also an oxo alkoxide, but with the stoichiometry $Nd_6O_5(OCHMe_2)_8$. Thus it appears that the stoichiometries and structures of the lanthanum isopropoxides may vary across the lanthanide series. Although yttrium is not a member of the lanthanide series, it occurs naturally with the lanthanides and has chemical properties similar to the heavier lanthanides. Two recent reports of reactions with acetylacetone reported by O. Poncelet et. al., *Polyhedron*, Vol. 8, (1989), pp. 218314 2188, and *Polyhedron*, Vol. 9, (1990), pp. 1305-1310, establish that different metal isopropoxides may give different products. Both of the products were characterized by X-ray crystallography, as:

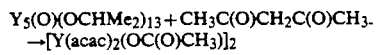

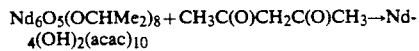

where acac is the acetylacetonate ligand.

In the catalyst syntheses given below, the products of lanthanum isopropoxide plus acetylacetone or beta-ketoesters are depicted as simple trisligand complexes, but it is understood that this may not be their true stoichiometries.

Simple tris ligand complexes of beta-diketones, $Ln(betadiketonate)_3$ are well known, and are usually prepared from $LnCl_3$ or $Ln(NO_3)_3$. These compounds have been reviewed by F. Hart, *Comprehensive Coordination Chemistry*, Vol. 3, pp. 1077-1081.

EXAMPLE 1

Preparation of $La[CH_3C(O)CHC(O)OCMe_3]_3$
(Lanthanum tris (t-butyl-acetoacetate)

Tert-Butylacetoacetate (7.267 g) was added dropwise to a stirring solution of lanthanum isopropoxide (5.225 g) in 100 ml of toluene over a period of 45 min. At the end of the addition, the mixture was stirred an additional 15 min, and then refluxed in an open flask in the drybox for 15 min. About half of the toluene evaporated. The remainder of the toluene was removed on a rotary evaporator, and the resulting solid was recrystallized from minimal pentane at −20° C. The first crop of white solid had a complex $^1H$ NMR spectrum. The pentane filtrates from this recrystallization were concentrated to give a solid which was tested for lactide polymerization. $^1H$ NMR ($C_6D_6$): 1.44 (s, 9H, —OCMe$_3$); 2.0 (s, 3H, $CH_3C(O)$—); 5.10, 5.13 (s, s, 1H, —C(O)CHC(O)—).

EXAMPLE 2

Preparation of Anhydrous Lanthanum tris(acetylacetonate)

Acetylacetone (3 ml) was added dropwise to a solution of lanthanum isopropoxide (0.80 g) in 4 ml of toluene. A white precipitate began to form partway through the addition. Additional toluene was added (4 ml) and the mixture was stirred overnight. The solvent was removed in vacuo and the residue was extracted with acetone. Filtration gave 0.363 g of acetone insoluble solid. The acetone filtrate was concentrated to a pale yellow oil. The oil was extracted with pentane. The pentane solution was filtered and the pentane was removed in vacuo to give a light yellow solid (0.771 g) which was tested for polymerization activity.

EXAMPLE 3

Preparation of $La[Me_3CC(O)CHC(O)CMe_3]_2$(2-ethylhexanoate)

2-Ethylhexanoic acid (0.209 g) dissolved in 1 ml of toluene was added dropwise to a stirring suspension of $La[Me_3C(O)CHC(O)CMe_3]_3$ in 50 ml of toluene. By the end of the addition, the mixture was homogeneous. After stirring for 10 hours, the solvent was removed in vacuo. The product was partially dissolved by the addition of 5.5 ml of toluene. This mixture was filtered through a medium fritted glass filter to remove 0.182 g of white solid. The filtrate was concentrated to give a thick yellow oil (0.739 g). The $^1H$ NMR spectrum of this material suggests that it might be a mixture of compounds but it does not appear to contain any of the La starting material. $^1H$ NMR($C_6D_6$): 0.5-2.5 (multiple peaks including two sharp —CMe$_3$ peaks at about 1.25, 50H); 2.62 (m, 1H, —CHCO$_2$—); 5.89, 5.91 (s, s, 2H, —C(O)CHC(O)—).

EXAMPLE 4

Preparation of $La[MeC(O)CHC(O)Me]$(2-ethylhexanoate)$_2$

2-Ethylhexanoic acid (0.907 ml, 1 equivalent/La) was added to a stirring suspension of commercial lanthanum acetylacetonate (Strem Chemical, 2.0 g). The mixture was heated to reflux for 5 minutes and there was still undissolved solid remaining. The addition and heating sequence was repeated with a second equivalent of acid. The mixture was filtered through a fine fritted glass filter to remove 0.085 g of insoluble material. The solvent was removed in vacuo and the resulting solid was dried at high vacuum/room temperature for 4 hours. The product was recrystallized from minimal pentane at −30° C. to give a white solid. Concentrated solutions of this compound have high viscosity and are fiber-forming.

EXAMPLE 5

Preparation of $La[MeC(O)CHC(O)Me]_2$(2-ethylbutyrate)

2-Ethylbutyric acid (0.533 g, 1 equivalent/La) was added dropwise to a stirring suspension of 2.00 g of commercial lanthanum acetylacetonate (Strem Chemicals). The mixture was stirred for 12 hours and then filtered through a fine fritted glass filter to remove 1.147 g of insoluble solid. The filtrate was concentrated in vacuo to give 0.800 g of solid. This material was fractionated by extraction with pentane and filtration to give a pentane insoluble solid (0.207 g). The pentane filtrates were concentrated in vacuo to give a light yellow solid (0.312 g). Both fractions were tested for polymerization activity. The $^1H$ NMR spectra of the two fractions were complex and difficult to interpret. The pentane insoluble fraction had integrals consistent with the product stoichiometry as written, the pentane soluble fraction did not. $^1H$ NMR (pentane insoluble fraction, $C_6D_6$): 1.10 (broad singlet, 5.4H, $(CH_3CH_2)_2CH$—); 1.4-2.5 (m with large peaks at 1.94, 1.97, 17.8H, $(CH_3CH_2)_2CH$—, $CH_3C(O)$—); 5.2-5.6 (m, 1.9H, —C(O)CHC(O)—). (pentane soluble fraction, $C_6D_6$): 0.8–1.3 (m, 4.7H, $(CH_3CH_2)_2CH-$); 1.5–2.2 (m with large peaks at 1.91, 1.96, 1.99, 17.6H, $(CH_3CH_2)_2CH-$, $CH_3C(O)-$); 5.2–5.4 (m, 2.7H, $-C(O)CHC(O)-$).

EXAMPLE 6

Preparation of La[MeC(O)CHC(O)Me]$_3$(H2O)$_3$

Commercial lanthanum acetylacetonate (Strem Chemicals) was recrystallized from 60% EtOH/water with a small amount of acetylacetone according to the procedure of G. W. Pope et. al., *J. Inorg. Nucl. Chem.*, Vol. 20, (1961), pp. 304–313. This material is insoluble in toluene and moderately soluble in THF. A small portion of the material did not dissolve in THF, so solutions used for polymerizations were filtered through 0.5 mm PTFE syringe filters to remove insoluble material.

EXAMPLE 7

Preparation of La[MeC(O)CHC(O)Me]$_3$(H2O)$_x$ (x less than 1)

Commercial lanthanum acetylacetonate (Strem Chemical) was recrystallized from refluxing 100% EtOH. The crystals were dried for 10 hours at room temperature under high vacuum. This procedure is similar to the one for preparing "anhydrous" rare earth acetylacetonates reported by M. F. Richardson et. al., *Inorg. Chem.*, Vol. 7, (1968), pp. 2495–2500. The product is insoluble in toluene and moderately soluble in THF. A small portion of the material did not dissolve in THF, so solutions used for polymerizations were filtered through 0.5 mm PTFE syringe filters to remove insoluble material.

EXAMPLE 8

Properties of Lanthanum tris (2,2,6,6-tetramethylheptane dionate)

Commercial material (Strem Chemicals) has the expected simple $^1$H NMR spectrum ($C_6D_6$) with sharp peaks at 1.244 ($-CMe_3$) and 5.893 ($-C(O)CHC(O)-$). There is also a small impurity peak at 5.840. The commercial material can be purified by sublimation at 200° C. in high vacuum with a typical recovery of 94%. After sublimation the NMR shifts are 1.264 and 5.909. Lanthanide complexes of this diketone ligand have been shown to form hydrates by J. S. Ghotra et. al. *J. Chem. Soc.*, Chemical Communications, (1973), pp. 113–114. The change in the NMR spectrum is attributed to dehydration that occurs when the hydrated commercial material is sublimed. The solubility of the sublimed complex in toluene is 17 mg/ml. Solubility in THF is considerably higher, and solubility in toluene containing 3% THF by volume is more than 10X greater than toluene alone.

EXAMPLE 9

Preparation of Tris (tert-Butylhydroxymethylene-d,l-camphorato) lanthanum

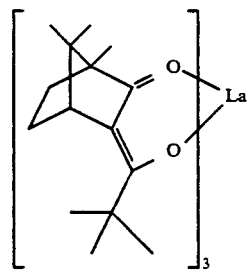

The beta-diketone ligand was prepared by the reaction of racemic camphor with NaH and methyl trimethylacetate in dimethoxyethane using the general procedure reported by H. L. Goering et. al., *J. Am. Chem. Soc.*, Vol. 96, (1974), p. 1493. The crude product was purified by Kugelrohr distillation at high vacuum. The desired fraction was collected at 60°–80° C. It was further purified according to the copper chelate procedure for purification of beta-diketones by M. D. McCreary et. al., *J. Am. Chem. Soc.*, Vol. 96, (1974), pp. 1038–1054. The lanthanum complex was prepared by reaction of the ligand with LaCl$_3$(H2O)$_7$ and NaOMe in MeOH according to the M. D. McCreary reference. (This paper reports the preparation of Tris[tert-Butylhydroxymethylene-d-camphorato]europium). The lanthanum complex as prepared had high solubility in pentane. After drying at 100° C. at high vacuum for several hours, its solubility in pentane and toluene decreased. High solubility could be restored by addition of a few % THF to the solutions. $^1$H NMR (After drying, $C_6D_6$): 0.81(s,3H,Me); 0.95(s,3H,Me); 1.11(s,3H,Me); 1.32(s,9H,$-CMe_3$); 1.59(bs,3H,$-CH_2CH_2-$); 1.96(s,1H,$-CH_2CH_2-$); 2.84(s,1H,bridgehead CH)

EXAMPLE 10

Preparation of Lanthanum tris (2,2,6-trimethyloctan-3,5-dionate)

(±)-2,2,6-trimethyloctan-3,5-dione ligand was prepared by the reaction of pinacolone with NaH and racemic methyl-2-methylbutyrate in dimethoxyethane using the general procedure reported by H. L. Goering et. al., *J. Am. Chem. Soc.*, Vol. 96, (1974), p.1493. The synthesis of stereochemically pure (+)-(S)-2,2,6-trimethyloctan-3,5-dione and its Eu complex have been reported by D. Seebach et. al., *Liebigs Ann. Chem.*, (1976), pp. 1357–1369.

A solution of LaCl$_3$(H2O)7 (5.0 g) in 50 ml of MeOH was added to a solution of (±)-2,2,6-trimethyloctan-3,5-dione (7.39 g) and NaOMe (2.17 g) in 290 ml of MeOH. The mixture became cloudy and was stirred for 2 hours. The mixture was filtered to remove insolubles, and an equal volume of water was added to the MeOH filtrate. This caused precipitation of the product, however the mixture could not be readily filtered so the bulk of the MeOH was removed in vacuo on a rotary evaporator. The product separated from the aqueous mixture as a yellow oil. The mixture was extracted with 4×200 ml of hexane. The combined hexane extracts were dried over MgSO4 and concentrated to give 1.46 g of crude product as a yellow oil. Sublimation at 200° C./high vacuum gave 0.678 g of waxy yellow solid. The product is highly soluble in organic solvents, being practically miscible with pentane. $^1$H NMR (C$_6$D$_6$): 0.99 (t, 3H,—CH$_2$CH$_3$); 1.24 (s, 12H, —CMe$_3$ and —CH(Me)—); 1.44 (m, 1H, —CH$_A$H$_B$CH$_3$); 1.80 (m, 1H, —CH$_A$H$_B$CH$_3$); 2.30 (bs, 1H, —CH(Me)CH$_2$CH$_3$); 5.67 (s, 1H, —C(O)CHC(O)—).

EXAMPLE 11

Polymerization Using Lanthanum tris (2,2,6,6-tetramethylheptane dionate) Catalyst 5 g L-lactide, polymer grade, is melted in a flame-dried, nitrogen-flushed glass test tube suspended in a 110° C. vapor bath. 70 microliters of 0.25M tetrahydrofuran solution of the catalyst is injected via hypodermic syringe to give a monomer to catalyst molar ratio of 2000/1. The clear, colorless mixture exhibits no flow behavior after 5 minutes. After an additional 3 minutes the tube is quenched in ice water to stop the reaction. Monomer conversion as measured by thermogravimetric analysis is 83%.

EXAMPLE 12

Polymerization Using Lanthanum tris (2,2,6,6-tetramethylheptane dionate) Catalyst 5 g L-lactide, polymer grade, is melted in a flame-dried, nitrogen-flushed glass test tube suspended in a 165° C. vapor bath. Immediately upon melting, 70 microliters of 0.25M toluene solution of the catalyst is injected via hypodermic syringe to give a monomer to catalyst molar ratio of 2000/1. The clear, pale yellow mixture exhibits no flow behavior after 1 minute. After an additional 1 minute a sample is quenched in cold water to stop the reaction. Monomer conversion as measured by thermogravimetric analysis is 95%.

EXAMPLE 13

Polymerization Using Lanthanum tris (2,2,6,6-tetramethylheptane dionate) Catalyst 5 g L-lactide, polymer grade, is melted in a flame-dried, nitrogen-flushed glass test tube suspended in a 165° C. vapor bath. After 5 minutes at 165° C., a stream of Argon is introduced at the bottom of the tube to enhance mixing while 70 microliters of a 0.25M toluene solution of the catalyst is injected via hypodermic syringe to give a monomer to catalyst molar ratio of 2000/1. The clear, colorless mixture exhibits no flow behavior after 20 seconds. After an additional 10 seconds a sample is quenched in cold water to stop the reaction. Monomer conversion as measured by thermogravimetric analysis is 91%.

EXAMPLE 14

Polymerization Using Lanthanum tris (2,2,6,6-tetramethylheptane dionate) catalyst 5 g L-lactide, polymer grade, is melted in a flame-dried, nitrogen-flushed glass test tube suspended in a 165° C. vapor bath. After 5 minutes at 165° C., a stream of Argon is introduced at the bottom of the tube to enhance mixing while 17.5 microliters of a 0.25M toluene solution of the catalyst is injected via hypodermic syringe to give a monomer to catalyst molar ratio of 8000/1. The clear, colorless mixture becomes viscous almost immediately, and after 1 minute a sample is quenched in cold water to stop the reaction. Monomer conversion as measured by thermogravimetric analysis is 66%.

EXAMPLE 15

Polymerization Using tris [tert-Butylhydroxymethylene-d,l-camphorato]lanthanum Catalyst 5 g L-lactide, polymer grade, is melted in a flame-dried, nitrogen-flushed glass test tube suspended in a 165° C. vapor bath. After 5 minutes at 165° C., a stream of Argon is introduced at the bottom of the tube to enhance mixing while 70 microliters of a 0.25M toluene solution of the catalyst is injected via hypodermic syringe to give a monomer to catalyst molar ratio of 2000/1. The clear, colorless mixture becomes viscous and pale yellow immediately, and after 15 seconds a sample is quenched in cold water to stop the reaction. Monomer conversion as measured by thermogravimetric analysis is 91%.

EXAMPLE 16

Polymerization Using Lanthanum tris (acetylacetonate) Catalyst 5 g L-lactide, polymer grade, is melted in a flame-dried, nitrogen-flushed glass test tube suspended in a 165° C. vapor bath. After 5 minutes at 165° C., 70 microliters of a 0.25M toluene solution of the catalyst is injected via hypodermic syringe to give a monomer to catalyst molar ratio of 2000/1. The clear, colorless mixture becomes viscous and pale yellow immediately, and after 35 seconds a sample is quenched in cold water to stop the reaction. Monomer conversion as measured by thermogravimetric analysis is 90%.

EXAMPLE 17

Polymerization Using Lanthanum tris (acetylacetonate) Catalyst 5 g L-lactide, polymer grade, is melted in a flame-dried, nitrogen-flushed glass test tube suspended in a 110° C. vapor bath. After 5 minutes at 110° C., 70 microliters of a 0.25M toluene solution of the catalyst is injected via hypodermic syringe to give a monomer to catalyst molar ratio of 2000/1. The clear, colorless mixture becomes viscous after 3 minutes, and after a total of 7 minutes a sample is quenched in cold water to stop the reaction. Monomer conversion as measured by thermogravimetric analysis is 48%.

EXAMPLE 18

Polymerization Using Lanthanum bis (2,2,6,6-tetramethylheptane dionate) (2-ethylhexanoate) Catalyst 5 g L-lactide, polymer grade, is melted in a flame-dried, nitrogen-flushed glass test tube suspended in a 165° C. vapor bath. After 5 minutes at 165° C., 70 microliters of a 0.25M toluene solution of the catalyst is injected via hypodermic syringe to give a monomer to catalyst molar ratio of 2000/1. The clear, colorless mixture becomes viscous after 1 minute, and after a total of 5 minutes a sample is quenched in cold water to stop the reaction. Monomer conversion as measured by thermogravimetric analysis is 90%.

EXAMPLE 19

Polymerization Using Lanthanum tris (2,2,6-trimethyloctan-3,5-dionate) Catalyst 5 g L-lactide, polymer grade, is melted in a flame-dried, nitrogen-flushed glass test tube suspended in a 165° C. vapor bath. After 5 minutes at 165° C., 70 microliters of a 0.25M toluene solution of the catalyst is injected via hypodermic syringe to give a monomer to catalyst molar ratio of 2000/1. The clear, yellow mixture exhibits no flow after 45 seconds, and after an additional 15 seconds a sample is quenched in cold water to stop the reaction. Monomer conversion as measured by thermogravimetric analysis is 95%.

EXAMPLE 20

Polymerization Using Bismuth tris (2,2,6,6-tetramethylheptane dionate) Catalyst 5 g L-lactide, polymer grade, is melted in a flame-dried, nitrogen-flushed glass test tube suspended in a 165° C. vapor bath. 175 microliters of 0.1M toluene solution of the catalyst is injected via hypodermic syringe to give a monomer to catalyst molar ratio of 2000/1. The cloudy gray mixture exhibits no flow behavior after 5 minutes. A small sample is quenched in ice water to stop the reaction. Monomer conversion as measured by thermogravimetric analysis is 83%.

EXAMPLE 21

Polymerization Using Scandium tris (2,2,6,6-tetramethylheptane dionate) Catalyst 5 g L-lactide, polymer grade, is melted in a flame-dried, nitrogen-flushed glass test tube suspended in a 165° C. vapor bath. 175 microliters of a 0.1M toluene solution of the catalyst is injected via hypodermic syringe to give a monomer to catalyst molar ratio of 2000/1. The mixture becomes viscous after 10 minutes and exhibits no flow behavior after 20 minutes. After a total of 25 minutes a small sample is quenched in ice water to stop the reaction. Monomer conversion as measured by thermogravimetric analysis is 79%.

EXAMPLE 22

Polymerization Using Lanthanum tris (t-butyl-acetoacetate) Catalyst 5 g L-lactide, polymer grade, is melted in a flame-dried, nitrogen-flushed glass test tube suspended in a 165° C. vapor bath. 35 microliters of a 0.5M toluene solution of the catalyst is injected via hypodermic syringe to give a monomer to catalyst molar ratio of 2000/1. The mixture becomes viscous after 1 minute, and after a total of 2 minutes a small sample is quenched in ice water to stop the reaction. Monomer conversion as measured by thermogravimetric analysis is 64%.

EXAMPLE 23

Polymerization Using Yttrium tris (acetylacetonate) Catalyst 5 g L-lactide, polymer grade, is melted in a flame-dried, nitrogen-flushed glass test tube suspended in a 165° C. vapor bath. 6.7 mg of the catalyst is added to give a monomer to catalyst molar ratio of 2000/1. The clear yellow mixture is viscous after 20 minutes, and after an additional 25 minutes a small sample is quenched in ice water to stop the reaction. Monomer conversion as measured by thermogravimetric analysis is 55%.

EXAMPLE 24

Polymerization Using Yttrium tris (2,2,6,6-tetramethylheptane dionate) Catalyst 5 g L-lactide, polymer grade, is melted in a flame-dried, nitrogen-flushed glass test tube suspended in a 165° C. vapor bath. 35 microliters of a 0.5M toluene solution of the catalyst is injected via hypodermic syringe to give a monomer to catalyst molar ratio of 2000/1. The clear colorless mixture is viscous after 2 minutes, and after a total of 6 minutes a small sample is quenched in ice water to stop the reaction. Monomer conversion as measured by thermogravimetric analysis is 84%.

EXAMPLE 25

Polymerization Using Tris(d,d-dicampholylmethanato)Europium Catalyst 5 g L-lactide, polymer grade, is melted in a flame-dried, nitrogen-flushed glass test tube suspended in a 165° C. vapor bath. 175 microliters of a 0.1M toluene solution of the catalyst is injected via hypodermic syringe to give a monomer to catalyst molar ratio of 2000/1. The cloudy yellow mixture becomes clear after 30 seconds, viscous after 1 minute, and after a total of 4 minutes a small sample is quenched in ice water to stop the reaction. Monomer conversion as measured by thermogravimetric analysis is 87%.

EXAMPLE 26

Polymerization Using Yttrium octoate Catalyst 5 g L-lactide, polymer grade, is melted in a flame-dried, nitrogen-flushed glass test tube suspended in a 165° C. vapor bath. 9 mg of the catalyst is added to give a monomer to catalyst molar ratio of 2000/1. The catalyst does not dissolve, and after a total of 29 minutes no reaction had occurred.

EXAMPLE 27

Polymerization Using Cerium tris(trifluoroacetyl acetonate) Catalyst 5 g L-lactide, polymer grade, is melted in a flame-dried, nitrogen-flushed glass test tube suspended in a 165° C. vapor bath. 175 microliters of a 0.1M toluene solution of the catalyst is injected via hypodermic syringe to give a monomer to catalyst molar ratio of 2000/1. The clear mixture becomes viscous after 30 minutes, and after a total of 60 minutes a small sample is quenched in ice water to stop the reaction. Monomer conversion as measured by thermogravimetric analysis is 80%.

EXAMPLE 28

Polymerization using Scandium tris(hexafluoroacac) catalyst 5 g L-lactide, polymer grade, is melted in a flame-dried, nitrogen-flushed glass test tube suspended in a 165° C. vapor bath. 175 microliters of a 0.1 M toluene solution of the catalyst is injected via hypodermic syringe to give a monomer to catalyst molar ratio of 2000/1. The clear mixture becomes viscous after 18 minutes, and a total of 30 minutes a small sample is quenched in ice water to stop the reaction. Monomer conversion as measured by thermogravimetric analysis is 42%.

EXAMPLE 29

Polymerization Using Praseodymium tris(hexafluoroacac) Catalyst 5 g L-lactide, polymer grade, is melted in a flame-dried, nitrogen-flushed glass test tube suspended in a 165° C. vapor bath. 175 microliters of a 0.1 M toluene solution of the catalyst in injected via hypodermic syringe to give a monomer to catalyst molar ratio of 2000/1. After a total of 10 minutes a small sample is quenched in ice water to stop the reaction. Monomer conversion as measured by thermogravimetric analysis is 14%.

EXAMPLE 30

Polymerization Using Lanthanum tris(acac).xH$_2$O (x less than 1) Catalyst 5 g L-lactide, polymer grade, is melted in a flame-dried, nitrogen-flushed glass test tube suspended in a 165° C. vapor bath. 87 microliters of a 0.2 M THF solution of the catalyst is injected via hypodermic syringe to give a monomer to catalyst molar ratio of 2000/1. The clear mixture becomes viscous after 60 seconds, and after a total of 5 minutes a small sample is quenched in ice water to stop the reaction. Monomer conversion as measured by thermogravimetric analysis is 82%.

EXAMPLE 31

Polymerization Using Lanthanum tris(acac).3H$_2$O Catalyst 5 g L-lactide, polymer grade, is melted in a flame-dried, nitrogen-flushed glass test tube suspended in a 165° C. vapor bath. 87 microliters of a 0.2 M THF solution of the catalyst is injected via hypodermic syringe to give a monomer to catalyst molar ratio of 2000/1. The clear mixture becomes viscous after 15 minutes, and a small sample is quenched in ice water to stop the reaction. Monomer conversion as measured by thermogravimetric analysis is 34%. (E68868-105).

EXAMPLE 32

Polymerization Using Anhydrous Lanthanum tris(acac) Catalyst 5 g L-lactide, polymer grade, is melted in a flame-dried, nitrogen-flushed glass test tube suspended in a 165° C. vapor bath. 87 microlites of a 0.2 M THF solution of the catalyst is injected via hypodermic syringe to give a monomer to catalyst molar ratio of 2000/1. The clear mixture becomes viscous after 15 seconds, and after a total of 35 seconds a small sample is quenched in ice water to stop the reaction. Monomer conversion as measured by thermogravimetric analysis is 90%.

EXAMPLE 33

Polymerization Using La[Me$_3$CC(O)CHC(O)CMe$_3$]$_2$(2-ethylhexanoate) Catalyst 5 g L-lactide, polymer grade, is melted in a flame-dried, nitrogen-flushed glass test tube suspended in a 165° C. vapor bath. 58 microliters of a 0.3 M toluene solution of the catalyst is injected via hypodermic syringe to give a monomer to catalyst molar ratio of 2000/1. The catalyst precipitates immediately, but redissolves after 45 seconds. The clear mixture becomes viscous after 1.5 minutes, and after a total of 5 minutes a small sample is quenched in ice water to stop the reaction. Monomer conversion as measured by thermogravimetric analysis is 76%.

EXAMPLE 34

Polymerization Using La[Me$_3$CC(O)CHC(O)CMe$_3$](2-ethylhexanoate)$_2$ Catalyst 5 g L-lactide, polymer grade, is melted in a flame-dried, nitrogen-flushed glass test tube suspended in a 165° C. vapor bath. 175 microliters of a 0.1 M toluene solution of the catalyst is injected via hypodermic syringe to give a monomer to catalyst molar ratio of 2000/1. The catalyst precipitates immediately to give a cloudy solution, but redissolves after 14 minutes. The clear mixture becomes only slightly viscous after 20 minutes, when a small sample is quenched in ice water to stop the reaction. Monomer conversion as measured by thermogravimetric analysis is 32%.

EXAMPLE 35

Polymerization Using La[MeC(O)CHC(O)Me]$_2$(2-ethylbutyrate) Catalyst 5 g L-lactide, polymer grade, is melted in a flame-dried, nitrogen-flushed glass test tube suspended in a 165° C. vapor bath. 175 microliters of a 0.1 M toluene solution of the catalyst is injected via hypodermic syringe to give a monomer to catalyst molar ratio of 2000/1. The yellow mixture becomes viscous after 30 seconds, and after a total of 2 minutes a small sample is quenched in ice water to stop the reaction. Monomer conversion as measured by thermogravimetric analysis is 92%.

Having thus described and exemplified the invention with a certain degree of particularity, it should be appreciated that the following claims are not to be so limited but are to be afforded a scope commensurate with the wording of each element of the claim and equivalents thereof.

We claim:

1. A process for polymerizing lactide comprising: contacting at 100° C. to 220° C. a lactide and up to 20 mole percent of another lactone selected from the group consisting of

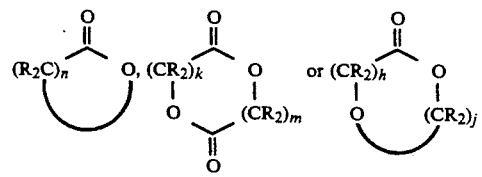

and mixtures thereof, where n is 4 or 5, h, i, k and m are independently 1 or 2, each R is independently selected from H, a hydrocarbyl containing up to 12 carbon atoms or substituted hydrocarbyl containing up to 12 carbon atoms with a catalytic amount of a catalyst of the formula MZ$_3$, wherein M is metal selected from the group consisting of scandium, yttrium, bismuth and lanthanide series rare earth metals and the Zs are independantly the same or different highly coordinating ligands wherein at least one Z is a betadiketone, betaketoester or malonate anion, and cooling the resulting polymer.

2. The process of claim 1 wherein the R in the lactone co-monomer is H or CH$_3$.

3. The process of claim 2 wherein all three Zs are a betadiketone, betaketoester or malonate anion 4. The process of claim 3 wherein the polymerization is carried out in the melt and a lactide homopolymer is being prepared.

5. The process of claim 4 wherein the metal M is lanthanum, cerium, praseodymium, neodymium, or mixtures thereof.

6. The process of claim 3 wherein all three Zs are a betadiketone anion.

7. The process of claim 6 wherein the polymerization is carried out in the melt and a lactide homopolymer is being prepared.

8. The process of claim 7 wherein the metal M is lanthanum, cerium, praseodymium, neodymium, or mixtures thereof.

9. The process of claim 6 wherein all three Zs are 2,2,6,6-tetrmethyl-3,5-heptanedionate.

10. The process of claim 9 wherein the polymerization is carried out in the melt and a lactide homopolymer is being prepared.

11. The process of claim 10 wherein the metal M is lanthanum, cerium, praseodymium, neodymium, or mixtures thereof.

12. The process of claim 11 wherein the metal M is lanthanum.

13. The process of claim 3 wherein MZ$_3$ is lanthanum tris tris (t-butyl-acetoacetate).

14. The process of claim 3 wherein MZ$_3$ is lanthanum tris (acetylacetonate).

* * * * *